United States Patent
Namiki et al.

(10) Patent No.: US 6,844,684 B2
(45) Date of Patent: Jan. 18, 2005

(54) FRONT FILM FOR FLAT DISPLAY PANEL AND FLAT DISPLAY DEVICE USING THE SAME

(75) Inventors: Fumihiro Namiki, Kawasaki (JP); Akira Nakazawa, Kawasaki (JP); Yoshimi Kawanami, Kawasaki (JP)

(73) Assignee: Fujitsu Hitachi Plasma Display Limited, Kawasaki (JP)

( * ) Notice: Subject to any disclaimer, the term of this patent is extended or adjusted under 35 U.S.C. 154(b) by 0 days.

(21) Appl. No.: 10/388,554

(22) Filed: Mar. 17, 2003

(65) Prior Publication Data

US 2003/0184225 A1 Oct. 2, 2003

(30) Foreign Application Priority Data

Mar. 29, 2002 (JP) ........................................ 2002-094830

(51) Int. Cl.⁷ ................................................. G09G 3/10
(52) U.S. Cl. ................................ 315/169.3; 315/169.4; 345/93; 349/54; 313/512
(58) Field of Search ............................ 315/169.3, 169.4; 313/494, 505, 506, 512, 495; 349/54, 192; 345/93

(56) References Cited

U.S. PATENT DOCUMENTS

| 4,807,973 | A | * | 2/1989 | Kawasaki ..................... 349/54 |
| 5,045,753 | A | * | 9/1991 | Katayama et al. .......... 313/494 |
| 5,729,309 | A | * | 3/1998 | Na et al. ....................... 349/54 |
| 5,969,779 | A | * | 10/1999 | Kim et al. ..................... 349/54 |
| 6,111,558 | A | * | 8/2000 | Jeung et al. .................. 345/93 |
| 6,111,621 | A | * | 8/2000 | Kim et al. ..................... 349/54 |
| 6,359,390 | B1 | * | 3/2002 | Nagai ....................... 315/169.1 |
| 2002/0050783 | A1 | * | 5/2002 | Kubota et al. .............. 313/495 |

FOREIGN PATENT DOCUMENTS

JP 2001-343898 12/2001

* cited by examiner

Primary Examiner—Don Wong
(74) Attorney, Agent, or Firm—Staas & Halsey LLP

(57) ABSTRACT

A front film for a flat display panel includes a sheet body having the form of a sheet to cover a display surface of a flat display panel. The sheet body has a repair wire attached to a part thereof for repairing an electrode of the flat display panel.

19 Claims, 10 Drawing Sheets

FRONT FILM FOR FLAT DISPLAY PANEL AND FLAT DISPLAY DEVICE USING THE SAME

CROSS-REFERENCE TO RELATED APPLICATION

This application is related to Japanese Patent Application JP2002-094830 filed on Mar. 29, 2002, whose priority is claimed under 35 USC § 119, the disclosure of which is incorporated by reference in its entirety.

BACKGROUND OF THE INVENTION

1. Field of the Invention

The present invention relates to a flat display panel on which a front film is attached and particularly to a film structure provided with a repair wire for repairing electrodes and a flat display panel using a film of the structure.

2. Description of Related Art

A plasma display panel (PDP) as a conventional flat display panel is disclosed in Japanese Unexamined Patent Publication No. 2001-343898. The PDP is now explained referring to FIG. 8 to FIG. 10. FIG. 8 illustrates a sectional view of a plasma display device having a conventional PDP, FIG. 9 illustrates a relationship between a light-emitting/non-light-emitting region and a bus bar region of a film-form front filter of a conventional PDP and FIG. 10 illustrates a detailed sectional view of a conventional film-form front filter.

As shown in FIG. 8, in the plasma display device having the conventional PDP, the PDP 101 is accommodated in a rectangular housing 106. A film-form front filter 102 is attached on the front face of the PDP 101. The PDP 101 is fixed on one face of a support substrate 104 disposed on the rear face of the PDP 101. A power supply circuit 105 and a circuit-mounted substrate 103 including various kinds of circuits are provided on the other face of the support substrate 104. The support substrate 104 is fixed to a rear panel 107, which is mounted to the housing 106. A fan 108 is provided on the upper part of the housing 106. An opening 106a corresponding to a light-emitting region of the PDP 101 is defined by a front frame 106b of the housing 106.

Also as shown in FIG. 9, the film-form front filter 102 has a rectangular shape which is somewhat larger than the PDP 101. The periphery of the film-form front filter 102 constitutes a bus bar region 102e. The bus bar region 102e is positioned at the outside of the periphery of the PDP 101 and electrically contact with a conductor (not shown) provided on the rear face of the front flame 106b of the housing 106. An electromagnetic wave radiated from the PDP 101 is converted into a current in the film-form front filter 102. By passing the current through the bus bar region 102e into the conductor of the housing 106, noise generated by the radiation of the electromagnetic wave is reduced.

Further, as shown in FIG. 10, the film-form front filter 102 is constituted by attaching an anti-reflection film (AR film) 102a as an optical property adjusting film on the front face of a transparent conductive film 102c via a transparent adhesive layer 102b. The anti-reflection film 102a and the transparent adhesive layer 102b do not extend to the periphery of the transparent conductive film 102c so that the periphery of the transparent conductive film 102c constitutes the bus bar region 102e as an exposed part of the conductive film. The transparent conductive film 102c is constructed, for example, by forming a film of ITO (indium-tin-oxide) on a substrate sheet made of PET (polyethylene terephthalate). An acrylic adhesive may be used for the transparent adhesive layer 102b. The film-form front filter 102 is attached on the front face of the PDP 101 by use of a transparent adhesive layer 102d applied on the rear face of the transparent conductive film 102c. The transparent adhesive layer 102d does not extend over the non-light-emitting region of the PDP 101. Therefore, the film-form front filter 102 can be detached from the non-light-emitting region and this detachable region is referred to as a repair region.

In the above construction of the conventional flat display device, the repair region is formed by detaching the filter 102 from the non-light-emitting region. In the case where discharge electrodes, for example, address electrodes are found broken by a lighting test of the PDP 101 after its production, a new repair wire must be provided, which will cause complicated repair. Therefore, the conventional flat display device has a problem that its repair cannot be carried out smoothly.

SUMMARY OF THE INVENTION

The present invention has been achieved for solving the above-mentioned problem, and an object thereof is to provide a front film for a flat display panel previously provided with a repair wire for simple repair and a flat display device using the film.

The present invention provides a front film for a flat display panel comprising a sheet body having the form of a sheet to cover a display surface of a flat display panel, the sheet body having a repair wire attached to a part thereof for repairing an electrode of the flat display panel. Thus, according to the present invention, the repair wire is previously formed in the film. For example, in a plasma display, when an address electrode is broken, the repair thereof can be carried out by recovering easily and smoothly electrical connection of the address electrode by use of the repair wire without further providing a new repair wire.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

In the present invention, if necessary, on the film, the repair wire may be formed at a location corresponding to a non-display region of the flat display panel. Thus, in the present invention, since the repair wire is formed at a location in the film which location corresponds to a non-display region of the flat display panel, the repair wire does not prevent display when the flat display panel is driven.

Further, the film of the present invention may include an electromagnetic shield layer, if necessary, and the repair wire may be formed by the same process as the electromagnetic shield layer is formed. Thus, according to the present invention, the repair wire which is similar in conductivity to the electromagnetic shield layer is formed by the same process. For this reason, production time and costs in forming the repair wire can be reduced by simplifying a process for producing the repair wire as compared with the case where the electromagnetic shield layer and the repair wire are separately formed.

In the present invention, the repair wire may be formed apart from the periphery of the electromagnetic shield layer, as required. Thus, according to the present invention, the electromagnetic shield layer and repair wire, which both have conductivity are formed so as not to contact with each other. Thereby they are electrically separated, which prevents a problem caused by interference.

The film of the present invention may be composed of at least one of an optical filter, an electromagnetic shield layer and a protective layer, if necessary.

A flat display device according to the present invention includes the above-described film attached on the front face of a flat display panel with intervention of a transparent adhesive layer.

In the flat display device of the present invention, a transparent protective board to which the above-described film is attached is provided on the front of the flat display panel.

The present invention provides a sheet-form front film for a plasma display panel to be mounted on a front face of the PDP having at least one of an optical filter and an electromagnetic shield layer, wherein a repair wire is provided at a location outside a display region of the front film for repairing an electrode of the plasma display panel.

In the flat display device of the present invention, the film may be attached on a display surface of the PDP with intervention of the transparent adhesive layer.

(A First Embodiment of the Present Invention)

Figure 1:
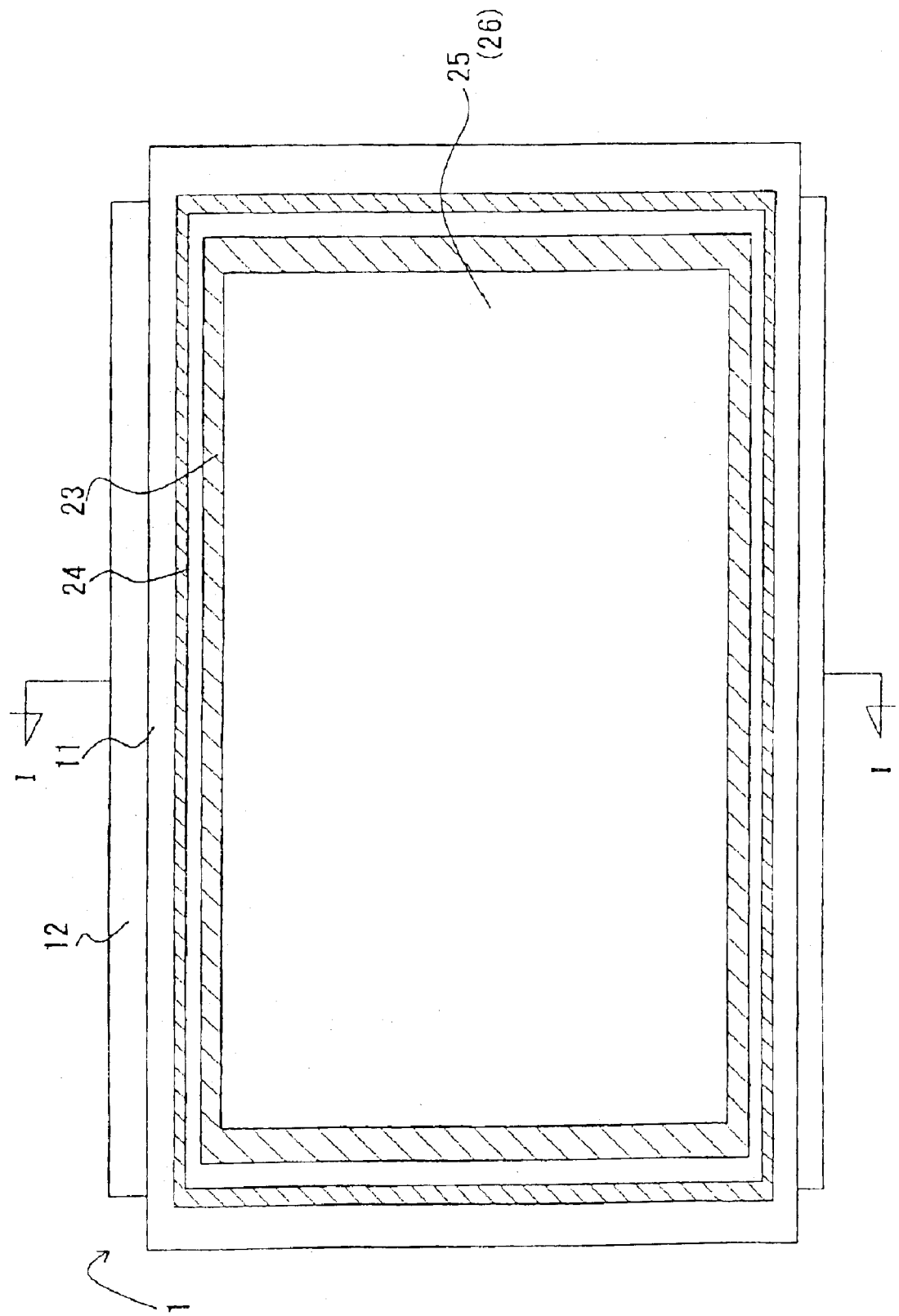
FIG. 1 is a front view of a PDP on which a film according to a first embodiment of the present invention is formed.
Figure 2:
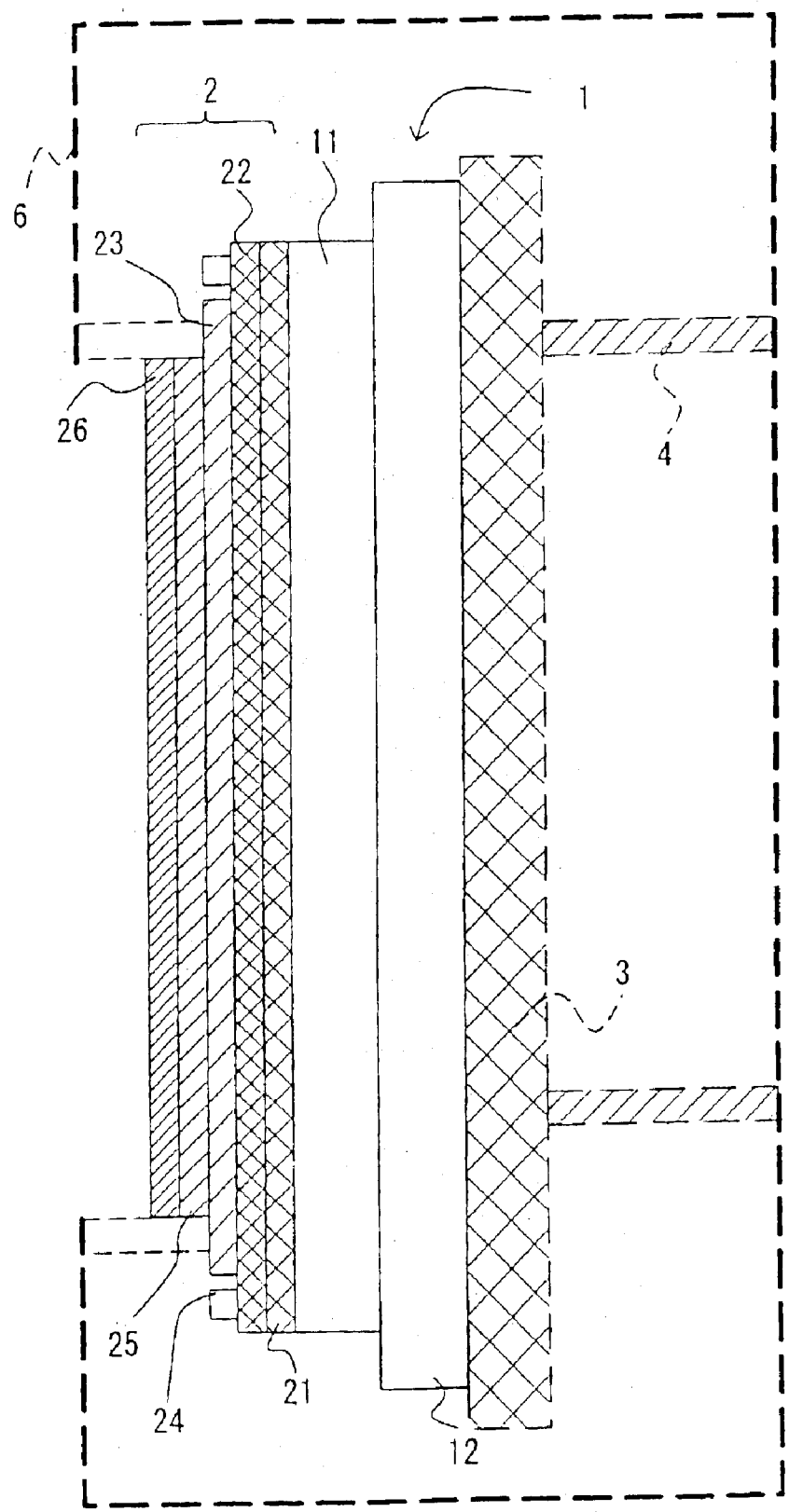
FIG. 2 is a sectional view taken along line I—I of the PDP shown in FIG. 1.
Figure 3:
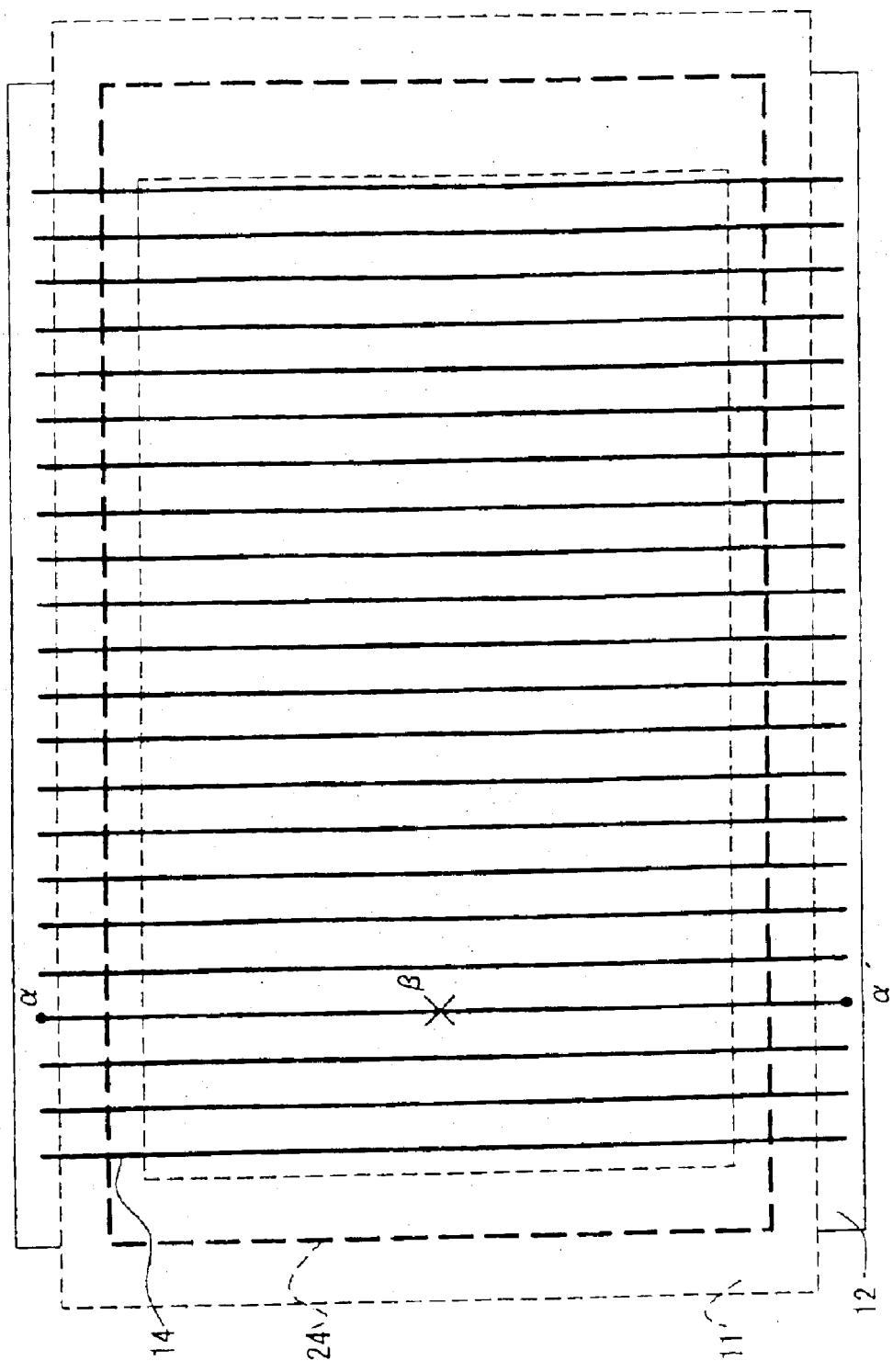
FIG. 3 is a view illustrating a break in an address electrode of a PDP according to a first embodiment of the present invention.
Figure 4:
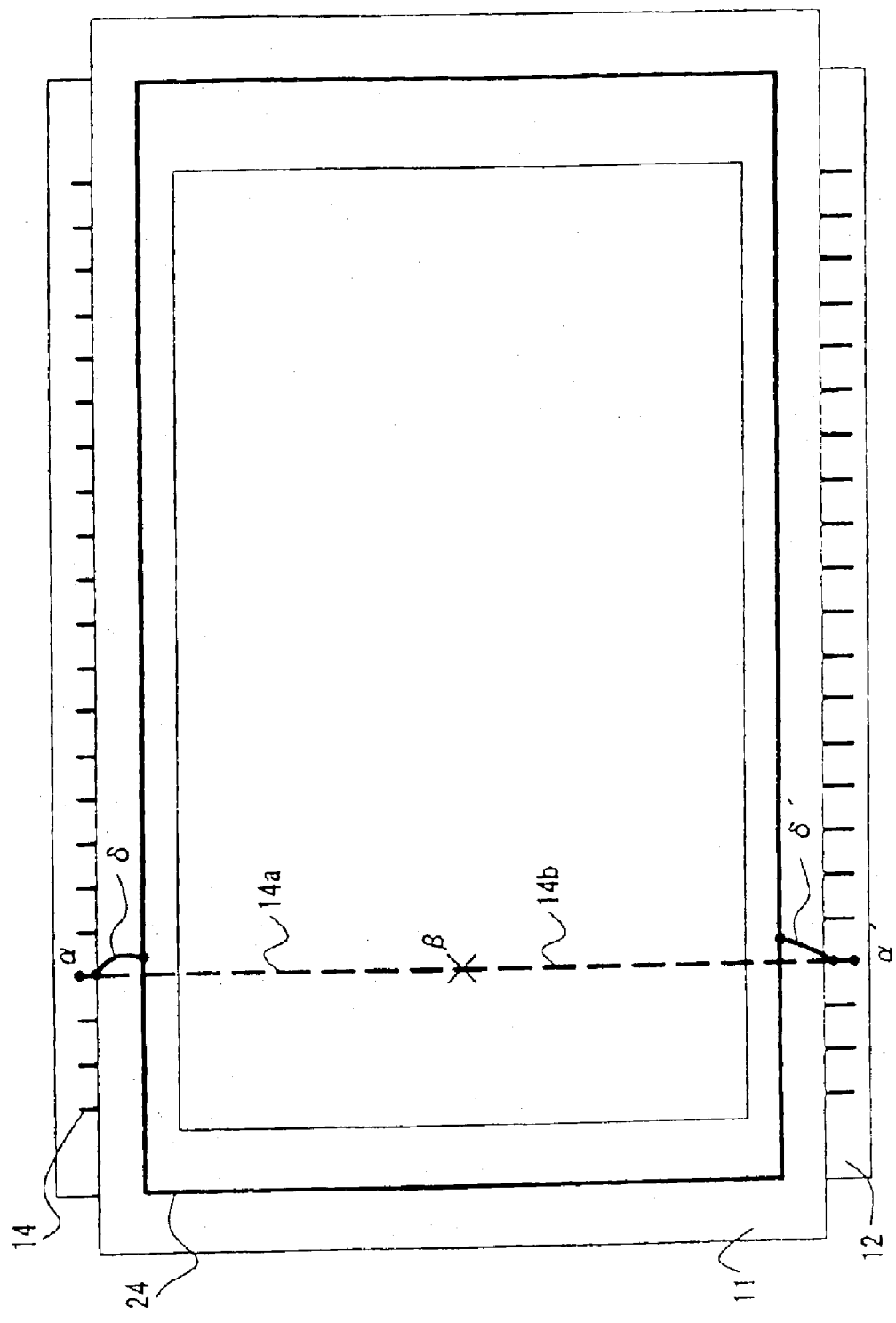
FIG. 4 is a front view of the PDP after repair according to the first embodiment of the present invention.
Figure 5:
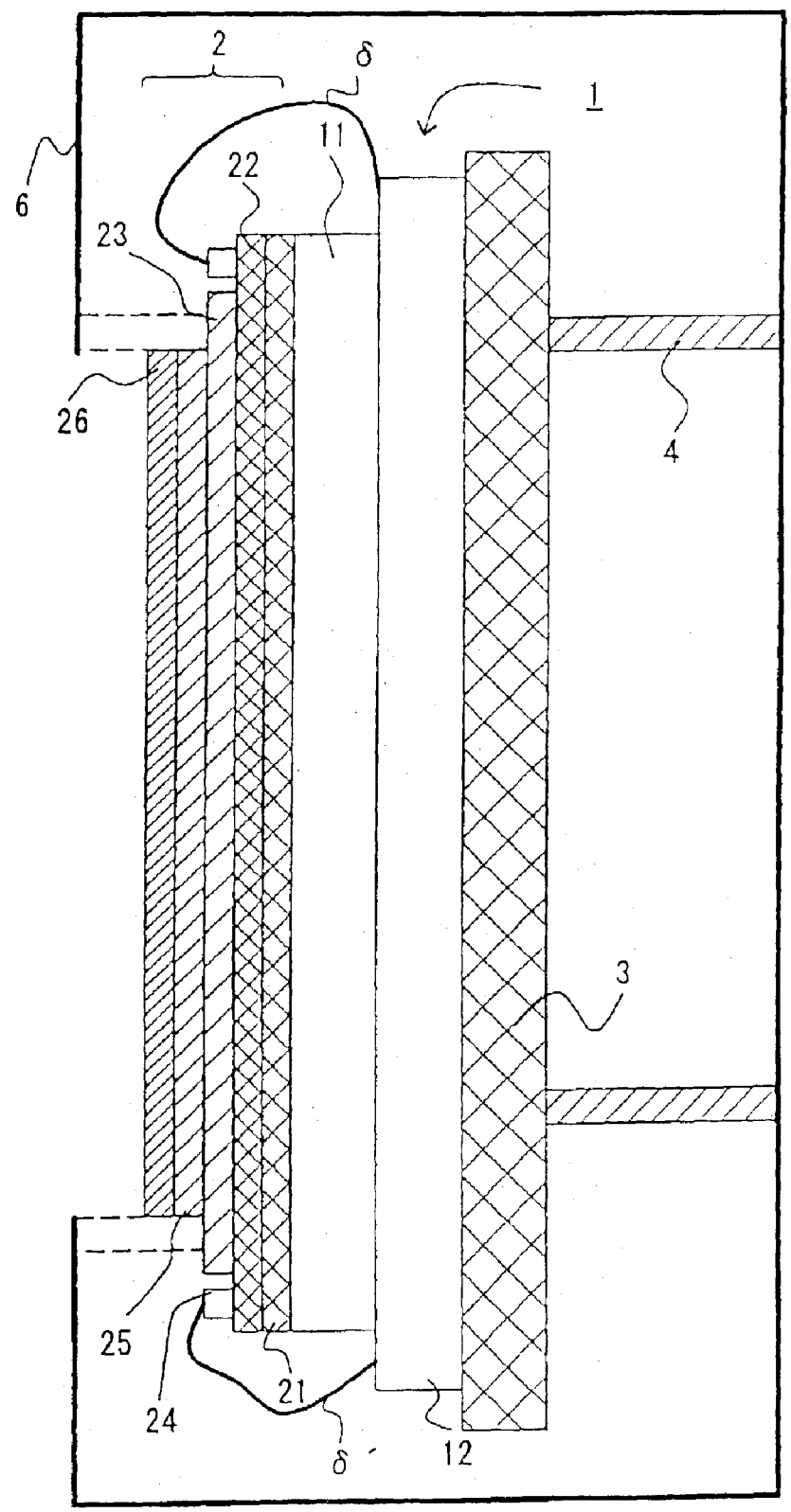
FIG. 5 is a sectional view of a plasma display device including the PDP after repair according to the first embodiment of the present invention.

The PDP as a flat display panel in accordance with a first embodiment of the present invention is now explained referring to FIGS. 1 to 5. FIG. 1 illustrates a front view of a PDP on which a film according to the present embodiment is formed; FIG. 2 shows a sectional view taken along line I—I of the PDP shown in FIG. 1; FIG. 3 illustrates a view illustrating a break in an address electrode of the PDP according to the present embodiment; FIG. 4 shows a front view of the PDP after repair according to the present embodiment; and FIG. 5 illustrates a sectional view of a plasma display device including the PDP after repair according to the present embodiment.

The plasma display device including a PDP 1 according to the present embodiment shown in the above figures comprises the PDP 1, a film 2 attached on the front face thereof, a driving circuit 3 for driving the PDP 1, a rectangular housing 6 for accomodating the PDP 1, the driving circuit 3 and the like and a fixing member 4 for fixing the PDP 1, the driving circuit 3 and the like to the housing 6.

Here, the above PDP 1 is assumed to be a usual three-electrode discharge PDP comprising a front substrate 11 on which main electrodes (sustain electrodes) (not shown) are arranged and a rear substrate 12 on which address electrodes are arranged and including a mixed gas of neon and xenon between the front substrate 11 and the address substrate 14.

A front substrates 11 is provided with a glass substrate as a base of the front substrate 11, a plurality of first main electrodes exclusively for a sustain discharge and a plurality of second main electrodes both for an address discharge and the sustain discharge which are arranged in pairs parallel to each other on an inside face of the glass substrate, a dielectric layer (not shown) for covering the first and the second main electrodes and a protective film (not shown) for protecting the electrodes etc. on the surface of the dielectric layers. The first and second main electrodes are each composed of a transparent electrode (not shown) and a bus electrode (not shown).

The rear substrate 12 is provided with a glass substrate (not shown) as a base of the rear substrate 12, address electrodes 14 arranged on the surface of the glass substrate so as to cross with the main electrodes on the front substrate 11 when the front substrate 11 is combined with the rear substrate 12 together, a dielectric layer (not shown) for covering the address electrodes 14, barrier ribs (not shown) on the dielectric layer for partitioning a discharge space and a fluorescent layer (not shown) of RGB colors formed between the barrier ribs.

The above film 2 includes a color adjusting layer 21 for filtering the color of light emitted by discharge gas, an infrared shield layer 22 for shielding a line spectrum in a near infrared light region radiated from the PDP 1, an electromagnetic shield layer 23 for shielding an electromagnetic wave radiated from the PDP 1 and a driving circuit 3, a repair wire 24 as a reserve wire to be used when the address electrode 14 is broken, the repair wire being provided according to the features of the present invention, an anti-reflection layer 25 for adjusting optical properties and a protective layer 26 for preventing a flow in this order from a PDP 1 side.

The color adjusting layer 21 preferably has a property of selectively absorbing/attenuating visible light in a predetermined wavelength region and a dye filter utilizing light absorption of the dye is used therefor. The electromagnetic shield layer 23 is formed of a thin-film silver or a thin-film ITO by sputtering. The anti-reflection layer 25 is composed of a layer multicoated by vapor deposition with various kinds of thin-film metal oxides each designated optically to have a different refractive index. The protective layer 26 is formed by polymerizing and curing a film of acrylic resin, siloxane resin, melanin resin or the like.

The repair wire 24 is formed of a thin-film silver by sputtering in the same manner and at the same time as the electromagnetic shield layer 23 is formed. The repair wire is provided in the film 2 to be attached on the display screen of the PDP 1, corresponding to a non-display region, and at the periphery of the electromagnetic shield layer 23. The repair wire 24 includes a connecting portion which is an exposed conductive portion for connecting to the driving circuit 3.

Hereinafter, a repair work of the PDP 1 will be explained according to the present embodiment. First, the completed PDP 1 is tested on conductivity of each electrode thereof, lighting of address cells and display cells thereof and the like. If a test result shows that an address electrode 14 is broken in the PDP 1, the film 2 having the repair wire 24 is attached on the PDP 1 via an adhesive layer (not shown). If the address electrodes 14 are not broken in the PDP 1 as a result of the above lighting test of the cells, a usual film not having the repair wire 24 is attached on the PDP 1 via an adhesive layer (not shown). Only the PDP 1 on which the film 2 having the repair wire 24 is attached will be explained hereinafter.

As shown in FIG. 3, the broken address electrode 14 is specified by the above test. By connecting to the driving circuit 3 at a connection point $\alpha$, the address electrode 14 allows address cells between the point $\alpha$ and a broken point $\beta$ to be lit up, but does not allow address cells between the point $\beta$ and a connection point $\alpha'$ to be lit up. Therefore, the address electrode 14a is connected at the point $\alpha$ to the repair wire 24 via a lead line $\delta$ and the address electrode 14b is connected at the point $\alpha'$ to the repair wire 24 via a lead line $\delta'$ (see FIGS. 4 and 5). Here, the upper side of the address electrode 14 is indicated by 14a and the lower side thereof is indicated by 14b at the boundary of the broken point $\beta$.

As connected above, a voltage is applied from the driving circuit 3 to the address electrode 14 including the broken point $\beta$, from the connection point $\alpha$ which is one end of the address electrode 14 to the repair wire 24 via the lead line $\delta$, from the repair wire 24 to the connection point $\alpha'$ which is the other end of the address electrode 14, and from the point $\alpha'$ to the address electrode 14b via the lead line $\delta'$. That is, it is possible to light up the address cells between the broken point $\beta$ and the connection point $\alpha'$ by recovering electrical connection of the address electrode via the repair wire 24.

According to the PDP 1 of the present embodiment, since the film 2 previously provided with the repair wire 24 is attached on the PDP 1, a lot of time and labor for forming a special repair wire can be omitted after attaching the film. The electromagnetic shield layer 23 comprising the thin film and the repair wire 24 is not conductive to each other. Thereby, the PDP 1 can be easily and smoothly completed.

(A Second Embodiment of the Present Invention)

Figure 6:
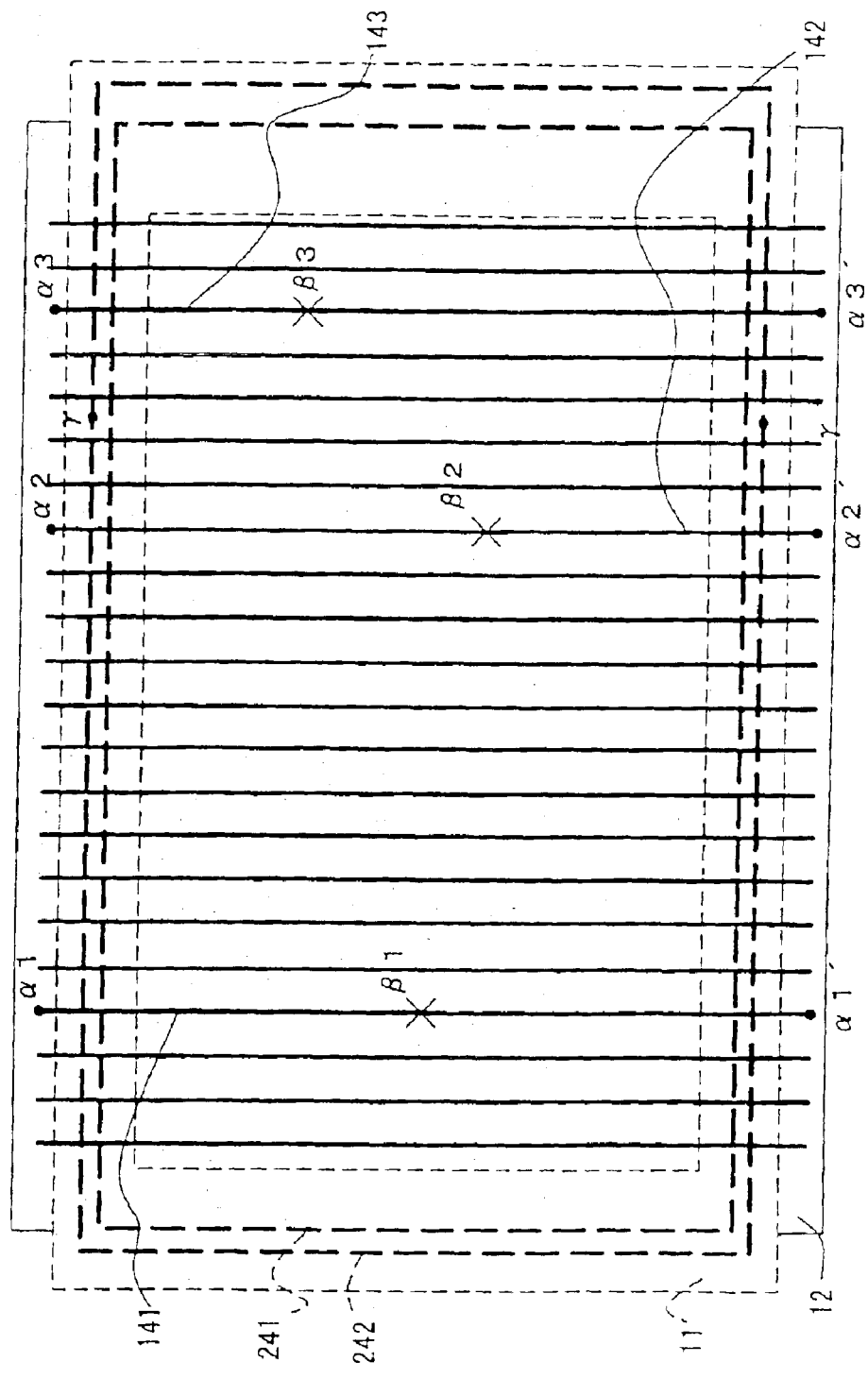
FIG. 6 is a view illustrating breaks in address electrodes of a PDP according to a second embodiment of the present invention.
Figure 7:
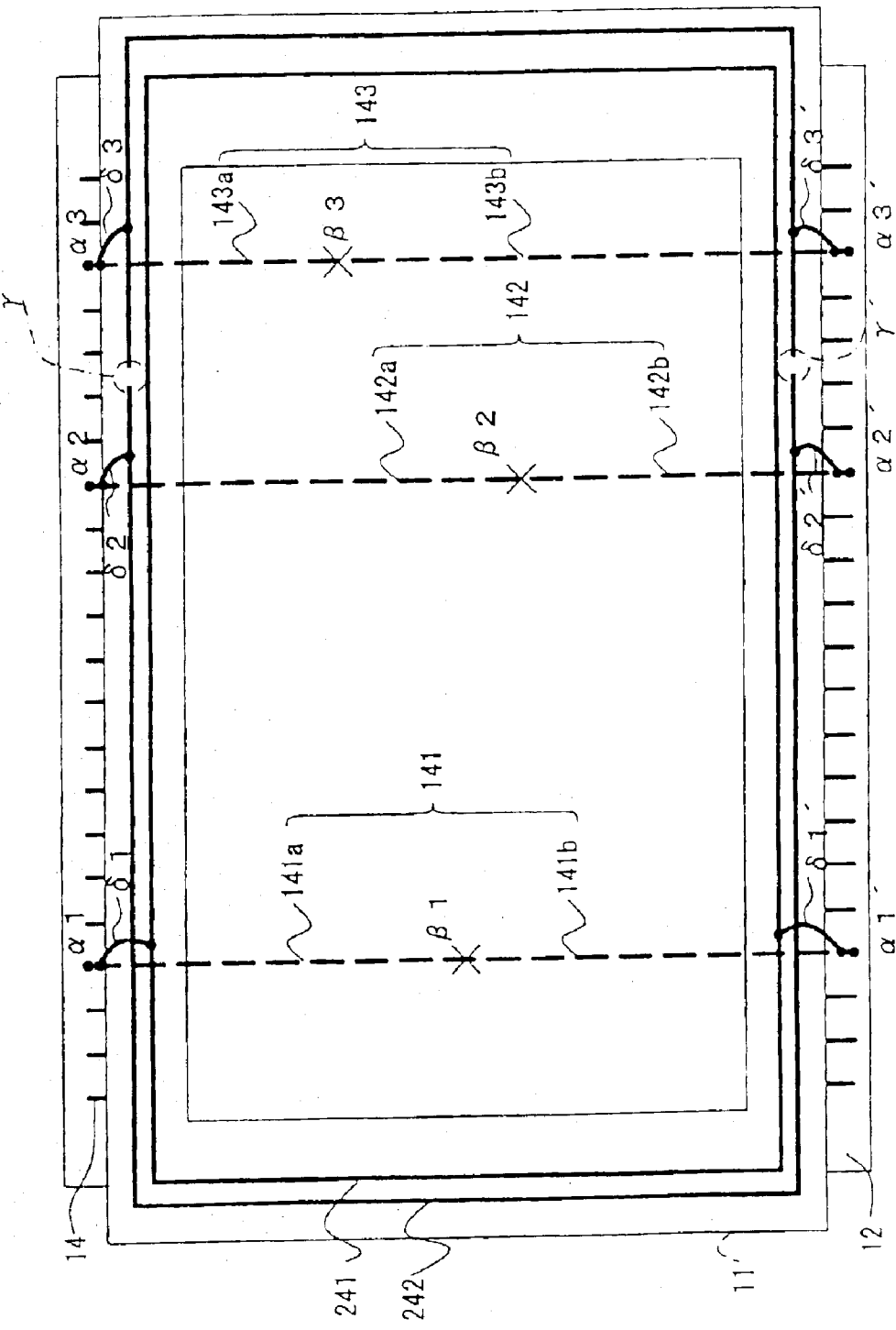
FIG. 7 is a front view of the PDP after repair according to the second embodiment of the present invention.
Figure 8:
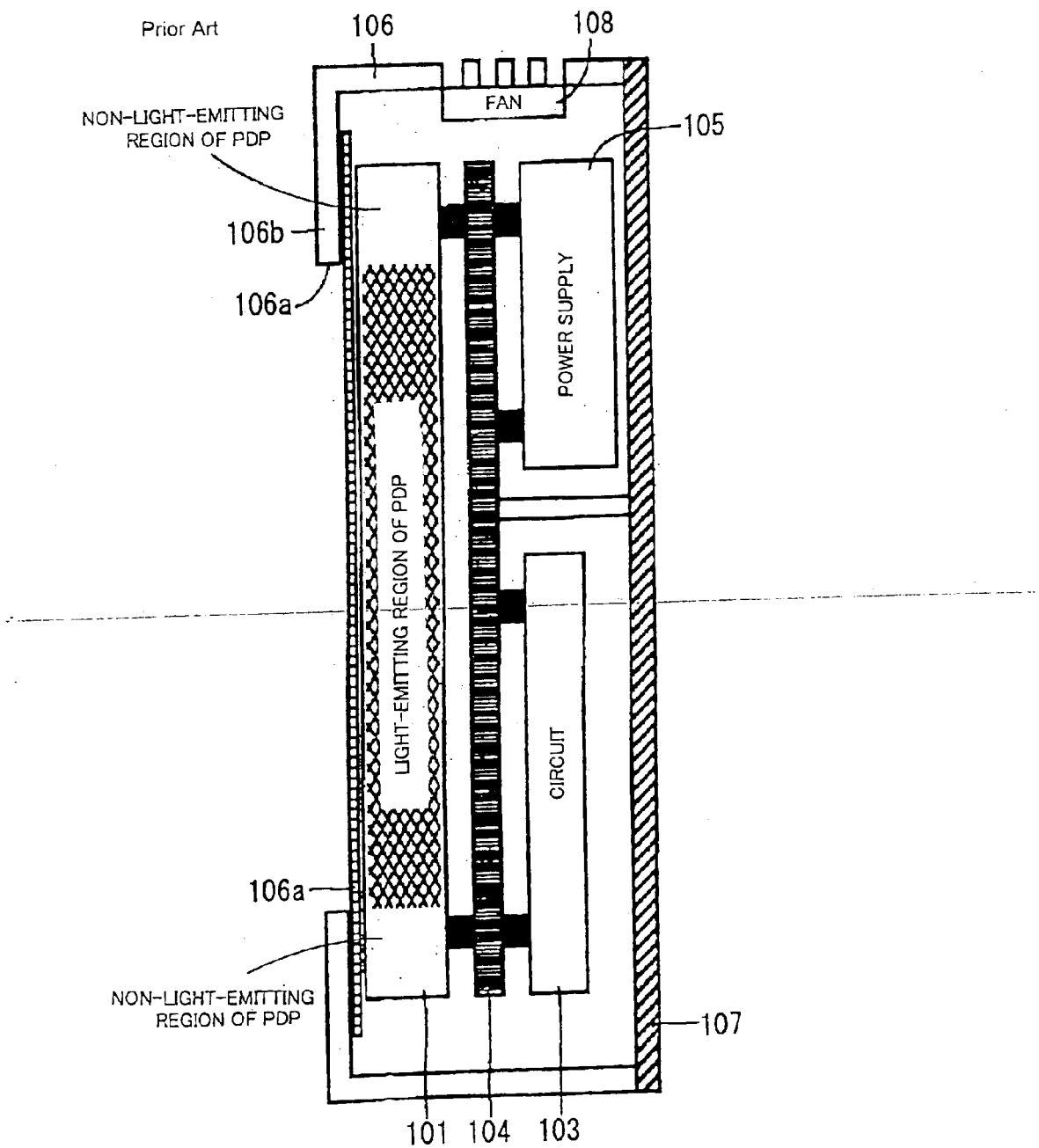
FIG. 8 is a sectional view of a plasma display device including a conventional PDP.
Figure 9:
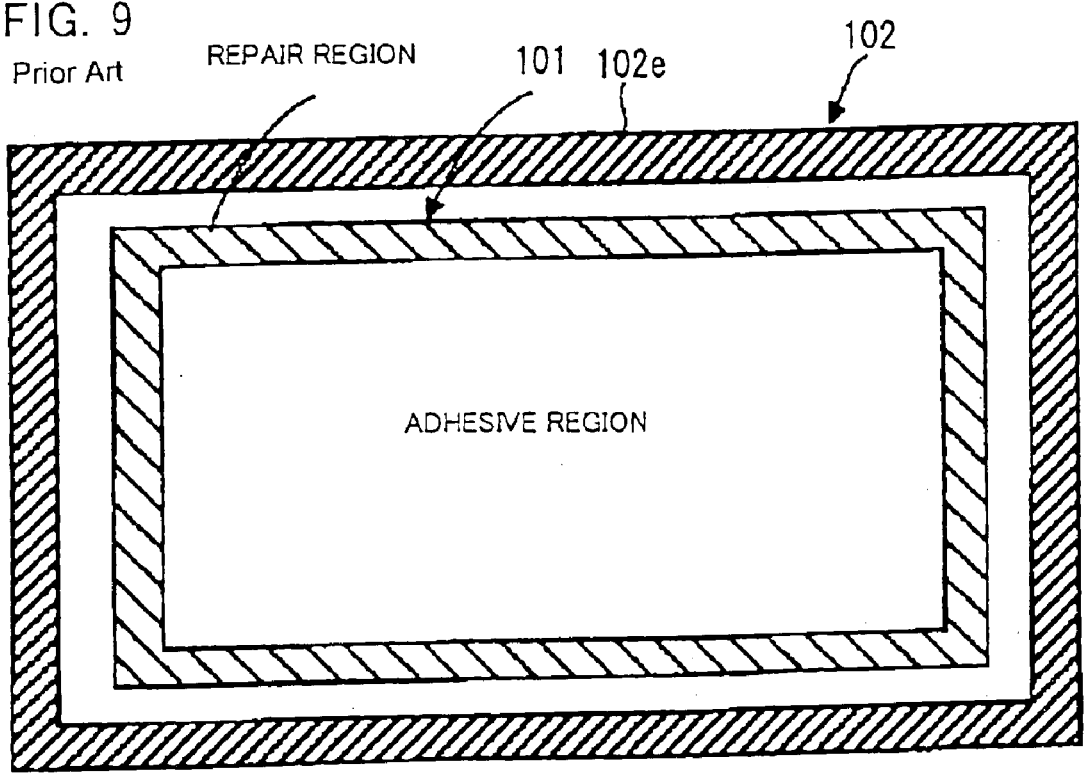
FIG. 9 is a view showing a relationship between a light-emitting/a non-light-emitting region and a bus bar region of a film-form front filter in a conventional PDP.
Figure 10:
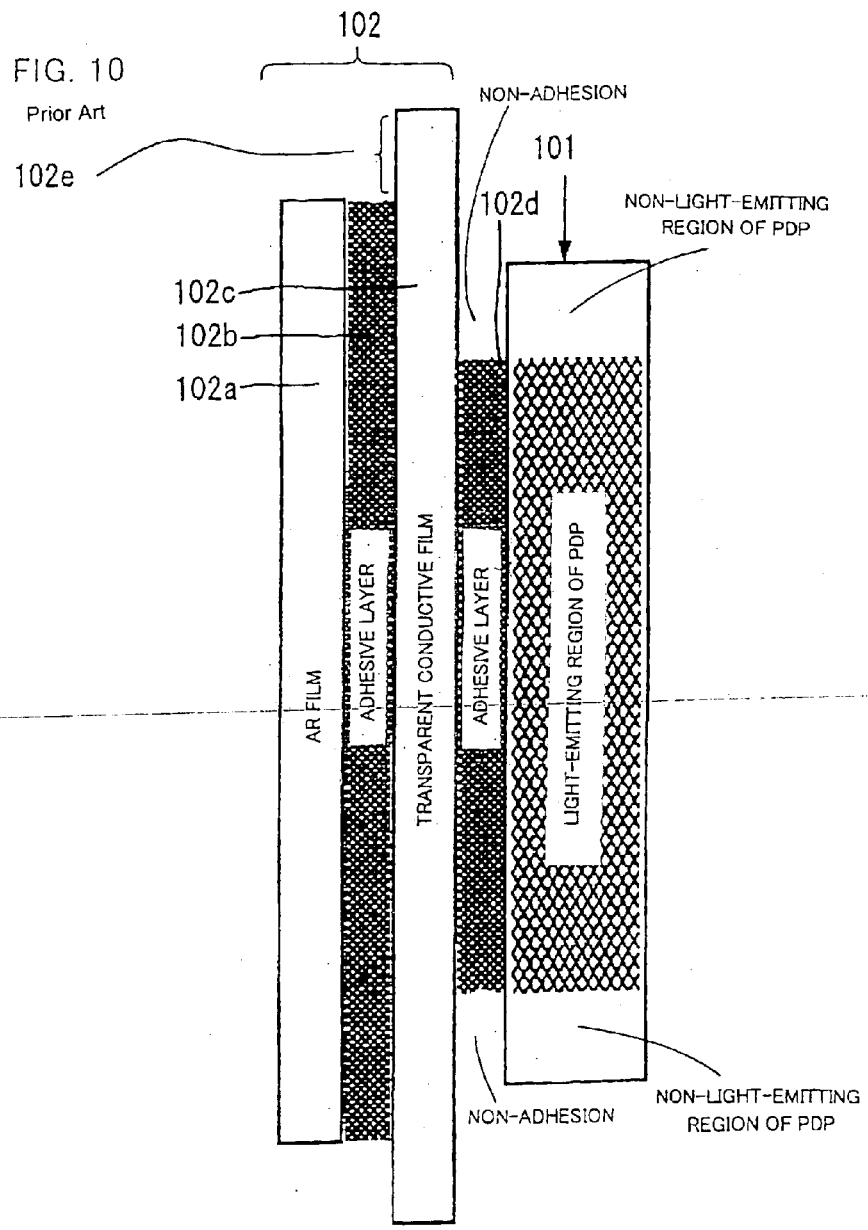
FIG. 10 is a detail sectional view of a conventional film-form front filter.

A PDP which as a flat display panel in accordance with a second embodiment of the present invention is now explained referring to FIG. 6 or 7. FIG. 6 shows a view illustrating breaks in address electrodes of a PDP according to the present embodiment and FIG. 7 shows a front view of the PDP after repair according to the present embodiment.

The PDP 1 of the present embodiment is constructed in substantially the same manner as in the first embodiment, except that two inside and outside repair wires 241 and 242 instead of the repair wire 24 are provided at a location in the film 2 corresponding to a non-display region of the PDP 1 and at the periphery of the electromagnetic shield layer 23 as shown in FIG. 6.

A repair work for electrodes of the PDP 1 according to the present embodiment will be explained in the case where, as shown in FIG. 6, three address electrodes 141, 142 and 143 are broken at broken points $\beta1$, $\beta2$ and $\beta3$, respectively. In the same manner as in the first embodiment, the lightning test is carried out on the PDP 1 with a film 2 attached thereto via an adhesive layer (not shown) and the first broken address electrode 141 is specified by the above test. By connecting to a driving circuit 3 at a connection point $\alpha1$, the address electrode 141 allows address cells between the point $\alpha1$ and the broken point $\beta1$ to be lit up, but dose not allow address cells between the point $\beta1$ and a connection point $\alpha1'$ to be lit up. Therefore, as shown in FIG. 7, the first address electrode 141a is connected at the point $\alpha1$ to the inside repair wire 241 via a lead line $\delta1$ and the first address electrode 141b is connected at the point $\alpha1'$ to the inside repair wire 241 via a lead line $\delta1'$. Here, the upper side of the first address electrode 141 is indicated by 141a and the lower side thereof is indicated by 141b at the boundary of the broken point $\beta1$.

The second broken address electrode 142 is specified by the above test. In the same manner as the first address electrode 141, by connecting to the driving circuit 3 at a connection point $\alpha2$, the address electrode 142 allows address cells between the point $\alpha2$ and the broken point $\beta2$ to be lit up, but does not allows address cells between the point $\beta2$ and a connection point a $\alpha2'$ to be lit up. Therefore, as shown in FIG. 7, the second address electrode 142a is connected at the point $\alpha2$ to an outside repair wire 242 via a lead line $\delta2$ and the second address electrode 142b is connected at the point $\alpha2'$ to the outside repair wire 242 via a lead line $\delta2'$. Here, the upper side of the second address electrode 142 is indicated by 142a and the lower side thereof is indicated by 142b at the boundary of the broken point $\beta2$.

The third broken address electrode 143 is specified by the above test. In the same manner as the first address electrode 141, by connecting to the driving circuit 3 at a connection point $\alpha3$, the address electrode 143 allows address cells between the point $\alpha3$ and the broken point $\beta3$ to be lit up, but does not allow address cells between the point $\beta3$ and a connection point $\alpha3'$ to be lit up. Therefore, as shown in FIG. 7, the third address electrode 143a is connected at the point $\alpha3$ to the outside repair wire 242 via a lead line $\delta3$ and the third address electrode 143b is connected at the point $\alpha3'$ to the outside repair wire 242 via a lead line $\delta3'$. Here, the upper side of the third address electrode 143 is indicated by 143a and the lower side thereof is indicated by 143b at the boundary of the broken point $\beta3$.

At the periphery of a display part of the PDP 1, the inside and outside repair wires 241 and 242 are provided. The circular repair wire 242 is partially cut out at points $\gamma$ and $\gamma'$, respectively. As connected above (see FIG. 7), a voltage is applied from the driving circuit 3 to the first address electrode 141 including the broken point $\beta1$, from the connection point $\alpha1$ which is one end of the first address electrode 141 to the inside repair wire 241 via the lead line $\delta1$, from the inside repair wire 241 to the connection point $\alpha1'$ which is the other end of the first address electrode 141 via the lead line $\delta1'$ and from the point $\alpha1'$ to the first address electrode 141b.

Similarly, a voltage is applied from the driving circuit 3 to the second address electrode 142 including the broken point $\beta2$, from the connection point $\alpha2$ which is one end of the second address electrode 142 to the outside repair wire 242 via the lead line $\delta2$, from the outside repair wire 242 to the connection point $\alpha2'$ which is the other end of the second address electrode 142 via the lead line $\delta2'$ and from the point $\alpha2'$ to the second address electrode 142b. In the same way, a voltage is applied from the driving circuit 3 to the third address electrode 143 including the broken point $\beta3$, from the connection point $\alpha3$ which is the one end of the third address electrode 143 to the outside repair wire 242 via the lead line $\delta3$, from the outside repair wire 242 to the connection point α3' which is the other end of the third address electrode 143 and from the point α3' to the third address electrode 143b.

Namely, it is possible to light up the address cells between the broken point β1 and the connection point α1', the address cells between the broken point β2 and the connection point α2', and the address cells between the broken point β3 and the connection point α3' by electrically recovering connection of the address electrodes via the repair wires 241 and 242. Electrical connections of the second address electrode 142 and the third address electrode 143 are separately maintained because of partial cut out of the repair wire 242 at the points γ and γ'.

The case where three address electrodes 14 are broken has been explained. However, except the case where two or more broken points exist on the same address electrode 14, a plurality of broken address electrodes 14 can all be recovered from disconnection by repair wires 24 in at least half the number of the broken address electrodes 14 by attaching a film 2 having the repair wires 24 in that number to the PDP 1, (however, where an odd number of electrodes are broken, it is necessary to subtract 1 from the number of broken electrodes, divide by 2, add 1 to the resulting quotient and get the resulting number of repair wires 24.)

According to the PDP 1 of the present embodiment, since the film 2 including the double repair wires is attached, it is possible to recover electric connection and light up address cells which was not able to be lit up due to breaks even if a plurality of the address electrodes 141, 142 and 143 are broken.

(The Other Embodiments)

In the above embodiments, the repair wire 24 is formed outside the display region of the PDP 1. However, the repair wire 24 may be formed within the display region by forming a transparent repair wire or by changing the form of the electromagnetic shield layer 23 to use a portion thereof as the repair wire 24 or use the portion both as the electromagnetic shield layer 23 and the repair wire 24.

Further, in the above embodiments, after the lighting test, the film 2 including the repair wire 24 is attached on the PDP 1 which is found to have the broken address electrodes 14. However, the films 2 with the repair wire 24 may be attached on all PDPs 1 regardless of whether or not the PDPs include broken address electrodes 14. Thus, manufacturing lines can be easily designed and operated.

According to the above embodiments, when the address electrodes 14 are broken, the film 2 including the number of repair wires 24 in accordance with the number of broken address electrodes is attached on the PDP 1. However, it is possible to attach the film 2 including a predetermined number of repair wires 24 on the PDP 1.

Though the film 2 is attached on the PDP 1 after the lighting test in the above embodiments, the film 2 including the repair wire 24 may be used for all PDPs 1 before the lighting test.

Further, according to the above embodiments, the film 2 to be attached on the PDP 1 is composed of the color adjusting layer 21, the infrared shield layer 22, the electromagnetic shield layer 23, the repair wire 24, the anti-reflection layer 25 and the protective layer 26. However, these components are not indispensable except for the repair wire 24, and the film 2 may be composed without some of them but the repair wire 24 is essential. In reverse, the film 2 can be constituted by adding other elements such as an impact easing layer for further protecting the panel from mechanical impact.

Although the PDP 1 is integrally combined with the film 2 attached thereon in the above embodiments, the film 2 and the PDP 1 can be separated. For example, the film 2 may be attached to the inside face of a transparent protective board (a transparent front cover board) which is provided at the frontmost of a plasma display.

Furthermore, according to the above embodiments, the repair wire 24 is formed of a thin-film silver by sputtering in the same manner and at the same time as the electromagnetic shield layer 23. However, the formation of the repair wire 24 is not particularly limited to the same manner and time as described above.

In the above embodiments, the repair wire 24 is used for repairing the broken address electrodes, but it can also be used for repairing the main electrodes (sustain electrodes). Further, it can also be applied to panels such as LCDs, ELs, FEDs and the like in addition to PDPs.

In view of the foregoing, since the film is previously provided with the repair wire, the present invention has an effect in carrying out repair by recovering easily and smoothly electrical connection with use of the repair wire formed on the film without providing a new repair wire, for example, when the address electrodes are broken in a plasma display.

In the present invention, the repair wire formed at a location in the film corresponding to a non-display region of the flat display panel does not prevent display when the flat display panel is driven. This is an effect of the present invention.

Since the repair wire which is similar in conductivity to the electromagnetic shield layer is formed by the same process, the present invention has an effect in capable of reducing production time and costs in forming the repair wire by simplifying a process for producing the repair wire compared with the case where the electromagnetic shield layer and the repair wire are separately formed.

Because the conductive electromagnetic shield layer and the conductive repair layer are formed so as not to contact with each other, they are not electrically connected and problems caused by interference can be prevented. This is another effect of the present invention.

What is claimed is:

1. A front film for a flat display panel comprising:
    a sheet body having the form of a sheet to cover a display surface of a flat display panel, the sheet body having a repair wire attached to a part thereof for repairing an electrode of the flat display panel, wherein
        the front film is to be attached to the display surface of the flat panel display,
        the repair wire is formed at a location corresponding to a non-display region of the flat display panel,
        the sheet body comprises an electromagnetic shield layer for shielding electromagnetic waves emitted from the flat Panel display and a driving circuit of the flat panel display,
        the repair wire is formed by a same process as the electromagnetic shield layer is formed, and
        the repair wire is spaced apart from the periphery of the electromagnetic shield layer.

2. The front film according to claim 1, wherein the sheet body comprises at least one of an optical filter, and a protective layer.

3. A flat display device having the front film as recited in claim 1, wherein the front film is attached on a front face of a flat display panel with intervention of a transparent adhesive layer.

4. A flat display device having a transparent protective board attached to the front of a flat display panel, wherein the front film as recited in claim 1 is attached to the transparent protective board.

5. A plasma display panel (POP) comprising:
a front substrate having vertical and lateral sides, the front substrate having a display surface defined on its outer surface;
a rear substrate having a vertical side greater than that of the front substrate; and a sheet film attached to the display surface,
wherein the rear substrate comprises a plurality of address electrodes for selecting a light-emitting cell, the plurality of address electrodes formed in stripes along the vertical side on an inner surface of the rear substrate, each address electrode having a length greater than the vertical side of the front substrate so that ends of each electrode are exposed from the front substrate, and
the sheet film comprises an electromagnetic shield layer and at least one repair wire for repairing the plurality of address electrodes, the electromagnetic shield layer and the repair wire being formed on the sheet film by one processing step, the repair wire being spaced apart from the electromagnetic shield layer so as to surround the electromagnetic shield layer, the repair wire being exposed along a periphery of the sheet film.

6. A plasma display panel as in claim 5, wherein the sheet film is attached to the display surface of the front substrate via a transparent adhesive layer.

7. A plasma display panel as in claim 5, wherein the sheet film further comprises a color adjusting layer, an infrared shield layer and an anti-reflection layer.

8. A plasma display panel as in claim 5, wherein the sheet film further comprises a protective layer formed on the display surface side of the electromagnetic shield layer.

9. An apparatus comprising:
plasma display panel (PDP) comprising
a front substrate having a display surface;
a rear substrate comprising address electrodes;
a sheet film attached to the display surface;
an electromagnetic shield layer formed on the sheet film; and
a repair wire formed on the sheet film for repairing the address electrodes,
wherein the electromagnetic shield layer and the repair wire are formed on the sheet film by a same process, and the repair wire is exposed along a periphery of the sheet film and spaced apart from the electromagnetic shield layer so as to surround the electromagnetic shield layer.

10. An apparatus as in claim 9, wherein the sheet film is attached to the display surface via a transparent adhesive layer.

11. An apparatus as in claim 9, wherein the sheet film comprises a color adjusting layer, an infrared shield layer and an anti-reflection layer.

12. An apparatus as in claim 9, wherein the sheet film comprises a protective layer formed on a display surface side of the electromagnetic shield layer.

13. A front film for a plasma display panel comprising:
a sheet-form front film to be mounted on a front face of the plasma display panel having at least one of an optical filter and an electromagnetic shield layer, wherein
the electromagnetic shield layer is for shielding electromagnetic waves emitted from the plasma display panel and a driving circuit of the plasma display panel
a repair wire is provided at a location outside a display region of the front film for repairing an electrode of the plasma display panel,
the repair wire is formed by a same process as the electromagnetic shield layer is formed, and
the repair wire is spaced apart from a periphery of the electromagnetic shield layer.

14. A plasma display device having the front film as recited in claim 13, wherein the front film is attached on a display surface of the plasma display panel with intervention of a transparent adhesive layer.

15. An apparatus comprising:
a flat display panel having a display surface;
a front film attached to the display surface, the front film comprising a sheet body covering the display surface and comprising a electromagnetic shield layer for shielding electromagnetic waves emitted from the flat panel display panel; and
a repair wire attached to the sheet body for repairing an electrode of the flat display panel, the repair wire being formed at a non-display region of the flat display panel and being formed by a same process as the electromagnetic shield layer, and the repair wire being spaced apart from the periphery of the electromagnetic shield layer.

16. An apparatus as in claim 15, wherein the sheet body comprises at least one of an optical filter and a protective layer.

17. A method comprising:
when a plasma display panel (PDP) has a broken address electrode, attaching a sheet film including at least an electromagnetic shield layer and a repair wire to a display surface of the POP, the POP comprising a front substrate having vertical and lateral sides and a rear substrate having a vertical side greater than that of the front substrate, the rear substrate providing a plurality of address electrodes for selecting a light-emitting cell, the plurality of address electrodes being formed in stripes along the vertical side on an inner surface of the rear substrate, each address electrode having a length greater than the vertical side of the front substrate so that ends of each electrode are exposed from the front substrate, the electromagnetic shield layer and the repair wire being formed on the same surface of the sheet film, the repair wire being formed on a periphery of the electromagnetic shield layer so as to surround the electromagnetic shield layer,
connecting an exposed terminal of the broken address electrode at an upper side of the rear substrate and an upper portion of the repair wire using a lead line; and
connecting an exposed terminal of the broken address electrode at a lower side of the rear substrate and a lower portion of the repair wire using a lead line.

18. A method comprising:
when a plasma display panel (PDP) has a broken address electrode, attaching a sheet film including at least an electromagnetic shield layer and a repair wire to a display surface of the PDP, the PDP comprising a front substrate and a rear substrate, the rear substrate providing address electrodes, the electromagnetic shield layer and the repair wire being formed on a same surface of the sheet film, the repair wire being formed on a periphery of the electromagnetic shield layer so as to surround the electromagnetic shield layer;
connecting an exposed terminal of the broken address electrode at an upper side of the rear substrate and an upper portion of the repair wire using a lead line; and connecting an exposed terminal of the broken address electrode at a lower side of the rear substrate and a lower portion of the repair wire using a lead line.

19. An apparatus comprising:

means, when a plasma display panel (POP) has a broken address electrode, for attaching a sheet film including at least an electromagnetic shield layer and a repair wire to a display surface of the POP, the PDP comprising a front substrate and a rear substrate, the rear substrate providing address electrodes, the electromagnetic shield layer and the repair wire being formed on a same surface of the sheet film, the repair wire being formed on a periphery of the electromagnetic shield layer so as to surround the electromagnetic shield layer;

means for connecting an exposed terminal of the broken address electrode at an upper side of the rear substrate and an upper portion of the repair wire using a lead line; and means for connecting an exposed terminal of the broken address electrode at a lower side of the rear substrate and a lower portion of the repair wire using a lead line.

* * * * *

UNITED STATES PATENT AND TRADEMARK OFFICE
CERTIFICATE OF CORRECTION

PATENT NO. : 6,844,684 B2
DATED : January 18, 2005
INVENTOR(S) : Fumihiro Namiki et al.

It is certified that error appears in the above-identified patent and that said Letters Patent is hereby corrected as shown below:

Column 8,
Line 52, change "Panel" to -- panel --.
Line 59, delete "," after "filter".

Column 9,
Line 1, change "(POP)" to -- (PDP) --

Column 10,
Line 17, change "fiat" to -- flat --.
Line 30, change "POP, the POP" to -- PDP, the PDP --.

Column 11,
Line 5, change "(POP)" to -- (PDP) --.
Line 8, change "POP" to -- PDP --.

Signed and Sealed this

Nineteenth Day of July, 2005

JON W. DUDAS
*Director of the United States Patent and Trademark Office*